United States Patent
Sasano

(10) Patent No.: US 8,200,429 B2
(45) Date of Patent: Jun. 12, 2012

(54) VEHICLE NAVIGATION APPARATUS

(75) Inventor: Takanori Sasano, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 634 days.

(21) Appl. No.: 12/379,741

(22) Filed: Feb. 27, 2009

(65) Prior Publication Data

US 2009/0228207 A1 Sep. 10, 2009

(30) Foreign Application Priority Data

Mar. 5, 2008 (JP) .................................. 2008-54958

(51) Int. Cl.
*G01C 21/12* (2006.01)

(52) U.S. Cl. ......... 701/467; 701/411; 701/454; 701/455

(58) Field of Classification Search .................. 701/208, 701/210, 211, 411, 454, 455, 467
See application file for complete search history.

(56) References Cited

U.S. PATENT DOCUMENTS

| | | | | |
|---|---|---|---|---|
| 5,340,061 | A * | 8/1994 | Vaquier et al. ................. | 244/175 |
| 5,797,106 | A * | 8/1998 | Murray et al. ................... | 701/11 |
| 5,931,888 | A * | 8/1999 | Hiyokawa ...................... | 701/208 |
| 6,081,802 | A * | 6/2000 | Atherton et al. .............. | 711/146 |
| 6,263,278 | B1 * | 7/2001 | Nikiel et al. ................... | 701/210 |
| 6,909,967 | B2 * | 6/2005 | Hirano et al. ................. | 701/209 |
| 6,952,661 | B2 * | 10/2005 | Agrawala et al. ................. | 703/2 |
| 7,050,905 | B2 * | 5/2006 | Nemeth ......................... | 701/201 |
| 7,271,742 | B2 * | 9/2007 | Sheha et al. ............. | 340/995.24 |
| 7,472,019 | B2 * | 12/2008 | Hara ............................ | 701/426 |
| 7,822,539 | B2 * | 10/2010 | Akiyoshi et al. ............... | 701/418 |
| 2001/0034588 | A1 * | 10/2001 | Agrawals et al. .................. | 703/2 |
| 2002/0177944 | A1 * | 11/2002 | Ihara et al. ..................... | 701/208 |
| 2005/0140524 | A1 * | 6/2005 | Kato et al. ............... | 340/995.13 |
| 2005/0209773 | A1 * | 9/2005 | Hara ............................ | 701/201 |
| 2006/0247825 | A1 * | 11/2006 | Omote ......................... | 700/245 |
| 2007/0024644 | A1 * | 2/2007 | Bailey .......................... | 345/633 |
| 2007/0083325 | A1 * | 4/2007 | Baba et al. ..................... | 701/208 |
| 2007/0198182 | A1 * | 8/2007 | Singh ........................... | 701/211 |
| 2008/0033633 | A1 * | 2/2008 | Akiyoshi et al. .............. | 701/201 |
| 2008/0162033 | A1 * | 7/2008 | Wagner et al. ................ | 701/201 |

FOREIGN PATENT DOCUMENTS

| | | |
|---|---|---|
| JP | A-07-091974 | 4/1995 |
| JP | A-08-247776 | 9/1996 |
| JP | A-2001-091283 | 4/2001 |
| JP | A-2006-259087 | 9/2006 |
| JP | A-2006-322781 | 11/2006 |

(Continued)

OTHER PUBLICATIONS

Minick, J., "New Software for Laptop Landfalls," Cruising World, vol. 21, No. 3, p. 30, Mar. 1995.*

(Continued)

*Primary Examiner* — Nicholas D Rosen

(74) *Attorney, Agent, or Firm* — Posz Law Group, PLC

(57) ABSTRACT

The navigation apparatus has a display unit ready to accept a user operation that moves a reference point of a navigation route already being defined on a map by the apparatus. The move of the reference point of the navigation route according to the user operation, together with map information, defines a new navigation route that incorporates route amendments. The navigation apparatus thus allows the user to easily and responsively modify an already-defined navigation route in a novel manner, which enables a rubber-banding of the already-defined navigation route.

13 Claims, 8 Drawing Sheets

FOREIGN PATENT DOCUMENTS

JP          2008039484 A    *   2/2008

OTHER PUBLICATIONS

Allen, P.M., "Incorporation of a Differential Global Positioning System (DGPS) in the control of an Unmanned Aerial Vehicle (UAV) for Precise Navigation in the Local Tangent Plane (LTP)" (Abstract), NASA No. 19980020871, published 1997.*

Mason, J., "Cockpit: Once the Envy of Every Pilot, Airliner Cockpits are Falling Behind as Business Aircraft Take the Technological Lead," Flight International, p. 39, Jun. 5, 2001.*

Webb, F., "Getting Your GPS to 'Talk' to Your Macintosh PC," Abstracts with Programs—Geological Society of America, vol. 34, No. 2, p. 47, Mar. 2002.*

De Paor, D.G. et al., "Application of Novel Presentation Techniques to a Structural and Metamorphic Map of the Pampean Orogenic Belt, NW Argentina," Abstracts with Programs—Geological Society of America, vol. 38, No. 7, p. 326, Oct. 2006.*

Hanks, C.W., "This Menlo Park Joke Has Gone Too Far," San Jose Mercury News, Peninsula/AM edition, p. 6B, Jun. 25, 1990.*

Anon., "Suggestions Invited for HUDA's Revised Master Plan," The Hindu, Jun. 2, 2007.*

Office Action dated Nov. 27, 2009 from the Japan Patent Office for corresponding patent application No. 2008-054958 (English translation enclosed).

* cited by examiner

VEHICLE NAVIGATION APPARATUS

CROSS REFERENCE TO RELATED APPLICATION

The present application is based on and claims the benefit of priority of Japanese Patent Application No. 2008-54958, filed on Mar. 5, 2008, the disclosure of which is incorporated herein by reference.

FIELD OF THE INVENTION

The present disclosure generally relates to a navigation apparatus for use in a vehicle.

BACKGROUND INFORMATION

Conventionally, a navigation apparatus such as the one disclosed in Japanese patent document JP-A-H07-91974 allows the user to "draw" or "trace" a desired navigation route from the current position to the destination on a displayed map on the screen, when the map is displayed on a touch-sensitive display screen. The traced roads on the displayed map are then recognized by the navigation apparatus as a navigation route, thereby enabling the user to specify a complicated route as a user-desired navigation route.

However, the above navigation apparatus forces the user to draw the desired navigation route from the scratch if the recognized route derived from the first route setting turns out to be different from a user-intended route. That is, in other words, even when the user desires to change just a portion of the recognized route, the entire route from the start point to the destination has to be re-drawn on the displayed map, in a manner that is similar to the first route setting for drawing the intended route. Thus, re-routing and partially modifying the recognized route are not easy for the user of the navigation apparatus.

SUMMARY OF THE INVENTION

In view of the above and other problems, the present disclosure provides a navigation apparatus that allows a user to easily modify a navigation route for use in a vehicle.

In an aspect of the present disclosure, the vehicle navigation apparatus having a storage unit for storing map information and displaying a travel route from a current position to a destination based on the map information includes: a display unit for displaying a map and the travel route based on the map information; a set unit for setting an edit start point and an edit end point respectively to one of edit points on the travel route according to a user operation; a move unit for moving, according to the user operation, a reference point selectively set to one of the edit points on the travel route being displayed on the display unit, on the map being displayed on the display unit; and a revision unit for revising the travel route that is defined by the edit start point and the edit end point, based on a position of the reference point having been moved by the move unit on the map, the edit start point and the edit end point respectively set by the set unit, a move direction of the movement of the reference point, and the map information.

The navigation apparatus of the present disclosure thus allows the user to modify a line of the already-set travel route in an easy and novel manner, based on the position of the reference point on the map, the edit start/end points, the reference point move direction, and the map information.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
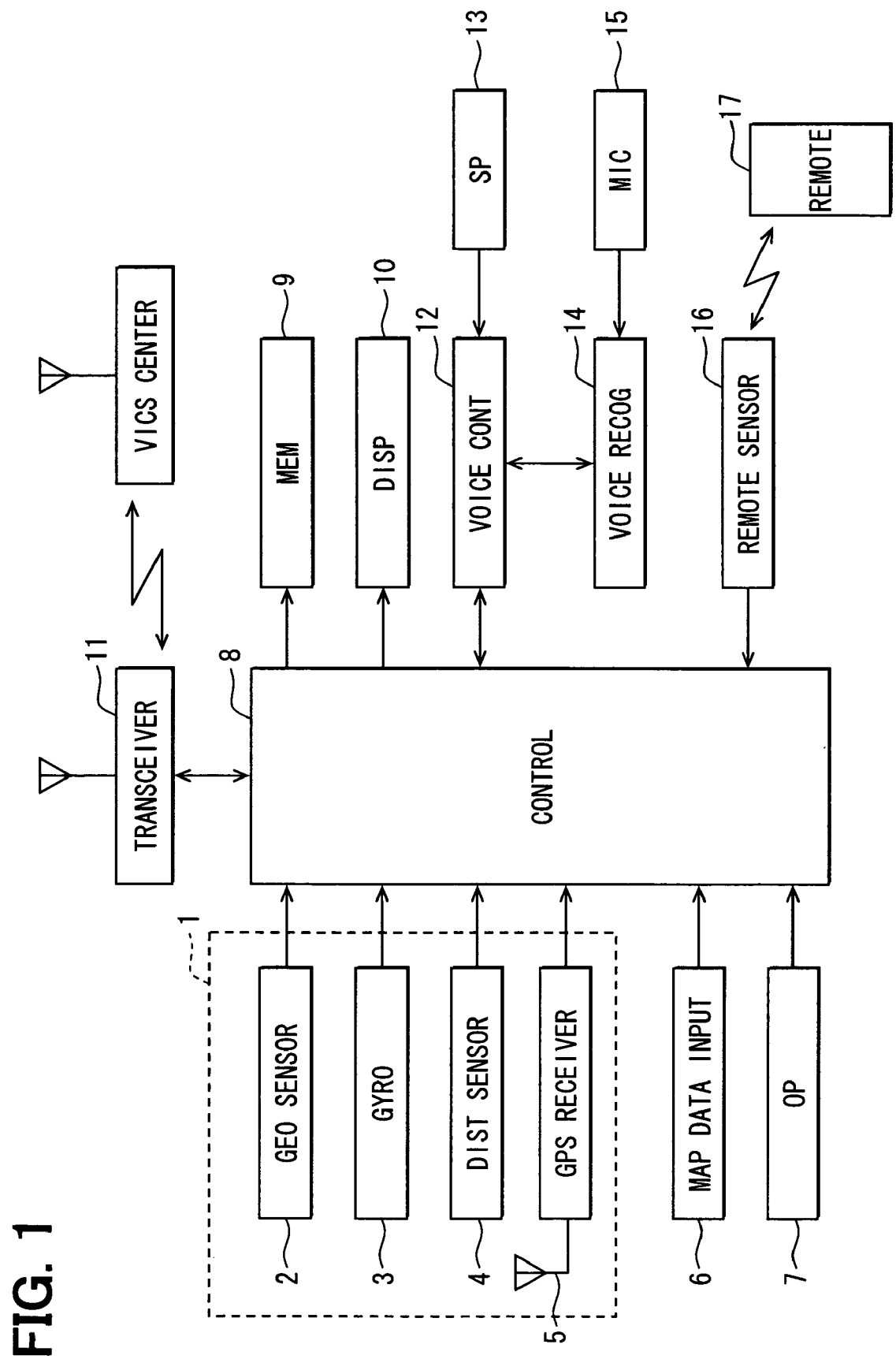
FIG. 1 is a block diagram of a navigation apparatus in an embodiment of the present disclosure.

The vehicle navigation apparatus according to an embodiment of the present disclosure is described as follows with reference to the drawing.

(First Embodiment)

1. Explanation of the Drawing

Figure 7A:
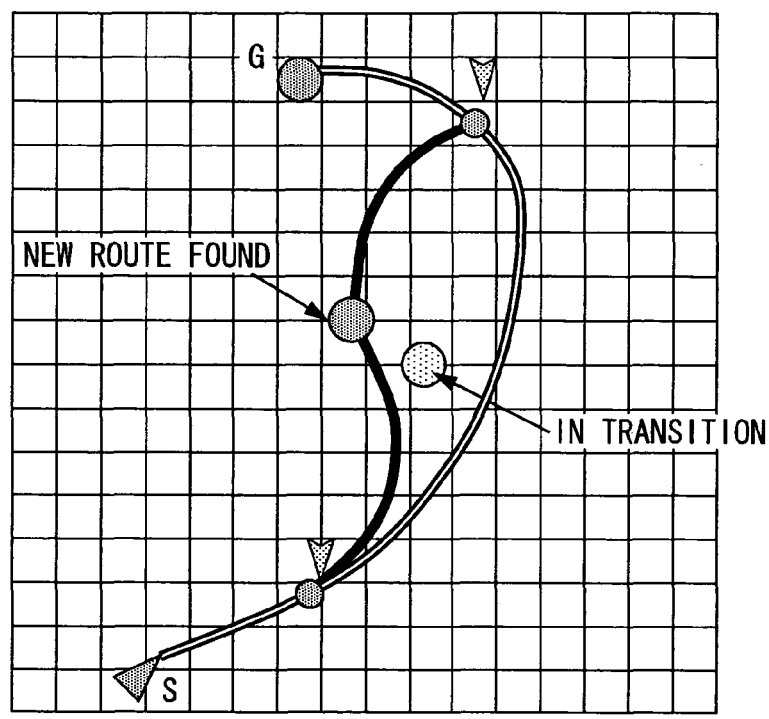
FIGS. 7A and 7B are illustrations of the travel route displayed on the screen of the navigation apparatus.
Figure 7B:
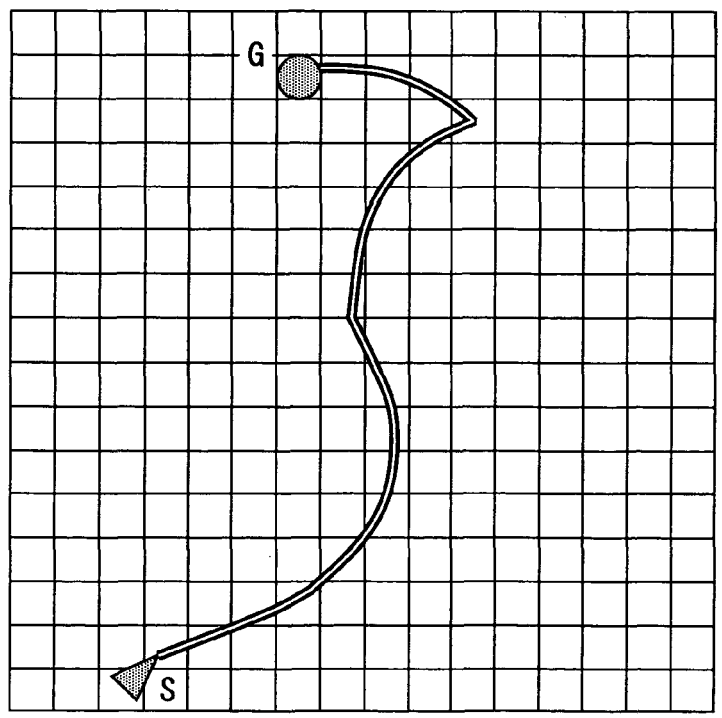
Figure 8:
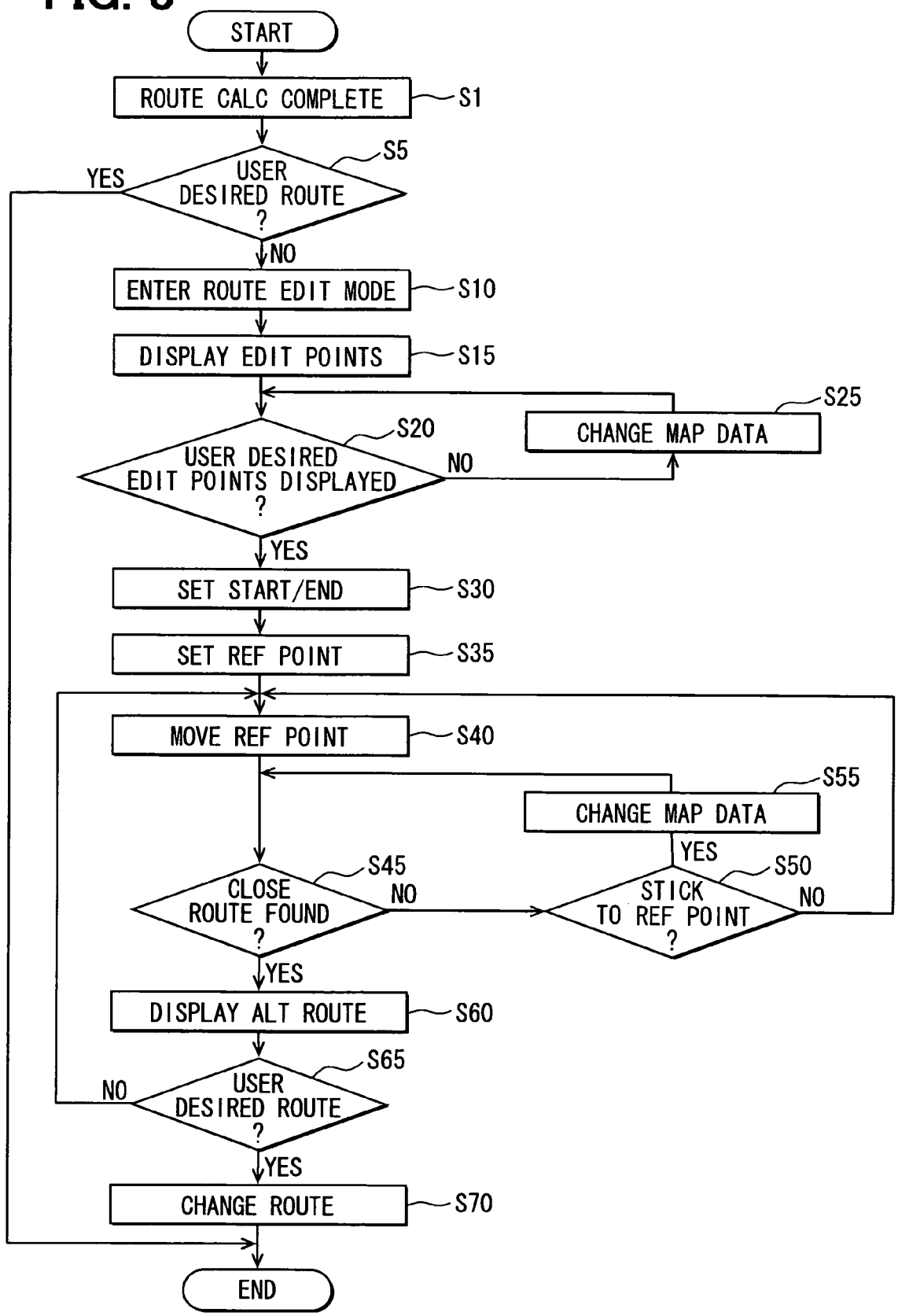
FIG. 8 is a flow chart of route edit control processing in a first embodiment of the present disclosure.

FIG. 1 is an outline of the navigation apparatus according to the present embodiment, and FIGS. 2 to FIG. 7 are examples of a travel route displayed on a display unit 10, and FIG. 8 is a flow chart of route edit control processing.

2. Outline of the Navigation Apparatus of the Present Embodiment

The navigation apparatus of the present embodiment includes a position detector 1, a map data input unit 6, an operation unit 7, a memory 9, the display unit 10, a transceiver 11, a voice controller 12, a speaker 13, a voice recognizer 14, a microphone 15, a remote controller sensor 16, a remote control terminal (Hereafter, it is called as a remote-controller) 17, and a control unit 8 having all these parts connected thereto.

The control unit 8 is a device for controlling the above identified parts. That is, the control unit 8 is a well-known type computer having a CPU, a ROM, a RAM, an I/O, and a bus line for interconnecting these components.

The control unit 8 receives information inputs from the position detector 1, the map data input unit 6, the operation unit 7, the memory 9, the display unit 10, the transceiver 11, the voice controller 12, the speaker 13, the voice recognizer 14, and the remote controller sensor 16, for performing various processing such as the map scale change, menu display and selection, destination setting, route search, route guide start, current position correction, display screen change, sound volume adjustments, and the like.

As for the position detector 1, a GPS receiver 5 for receiving a radio wave from GPS (Global Positioning System) satellites, as well as a geo-magnetism sensor 2, a gyroscope 3, a distance sensor 4 and the like are incorporated. The position detector 1 uses those components 2 to 5 in a mutually-compensating manner for detecting a position of a vehicle.

Further, the position detector 1 may selectively use only a part of the components 2 to 5, or may incorporate other sensors such as a steering rotation sensor, a tire rotation sensor or the like.

The map data input unit 6 is a device for inputting map information from a memory medium (not shown in the drawing) to the navigation apparatus (i.e., to the memory 9). The memory medium used by the input unit 6 provides various kinds of data, including so-called map matching data for improvement of the position detection accuracy, as well as map data, landmark data and the like.

The map data input unit 6 is capable of reading data from various recording media, such as an optical medium (e.g., a CD-ROM, a DVD-ROM and the like) as well as a semiconductor medium of memory cards and a magnetic medium of a HDD.

The operation unit 7 is a user interface having either or both of a touch switch (touch panel function) that is integrally disposed on the display unit 10 as well as a mechanical switch or the like. The operation unit 7 is used to provide an instruction from the user to the control unit 8, for the purpose of utilizing various functions such as map scale change, menu display and selection, destination setting, route search, route guide start, current position correction, display screen change, sound volume adjustments, and the like.

Further, the remote controller 17 has operation switches (not shown in the drawing) for transmitting instruction signals respectively corresponding to above-described functions. The instruction signal generated by one of the switches is input to the control unit 8 through the remote controller sensor 16.

The memory 9 is a large volume storage device such as a hard disk drive (HDD). The memory 9 stores data having the large data volume as well as data that should not be lost while the power supply is turned off. Further, the memory 9 may store frequently used data after copying the data from the map data input unit 6. The memory 9 may also be a small volume, removable memory medium.

The display unit 10 is a display device capable of displaying a navigation map, a destination selection menu and the like in full-color, by using the liquid crystal display, an organic electro-luminescence (organic EL) display, or the like.

The transceiver 11 is a device receiving and sending information from/to an outside of the vehicle. The information may include traffic information, weather information, facilities information, advertising information, etc. provided from the outside resources (VICS (Vehicle Information and Communication System implemented in Japan), for example), and may also include vehicle information, user information, etc. sent to the outside of the vehicle. The information received and sent through the transceiver 11 is processed by using the control unit 8.

The speaker 13 is a sound notification device that provides sound guidance and/or notification based on voice output signals from the voice controller 12. The sound guidance includes guidance voice for navigation and menu operations as well as voice recognition result by the voice recognizer. The microphone 15 is a device for inputting user's voice as an electric signal to the voice recognizer 14.

The voice recognizer 14 inputs a recognition result into the voice controller 12 after comparing the input voice derived from the microphone 15 and the vocabulary data in the internal dictionary (not shown in the drawing) that serves as a comparison reference pattern and determining the best matching recognition result. On the other hand, the voice controller 12 controls the voice recognizer 14 to talk-back, through the speaker 13, to the user who has provided the voice input (i.e., to provide voice output to the user), and transmits the recognition results by the voice recognizer 14 to the control unit 8.

Further, the control unit 8 executes prescribed processing such as, for instance, map scale change processing, menu display and selection processing, destination setting processing, route search processing, route guide start processing, current position correction processing, display change processing, volume adjustments processing, and the like, according to voice of the user on the basis of information from the voice recognizer 14. In this case, at the time of performance of the route guide start processing, for example, the processed information such as route guidance voice information processed by the control unit 8 is notified from the speaker 13 through the voice controller 12.

Figure 2:
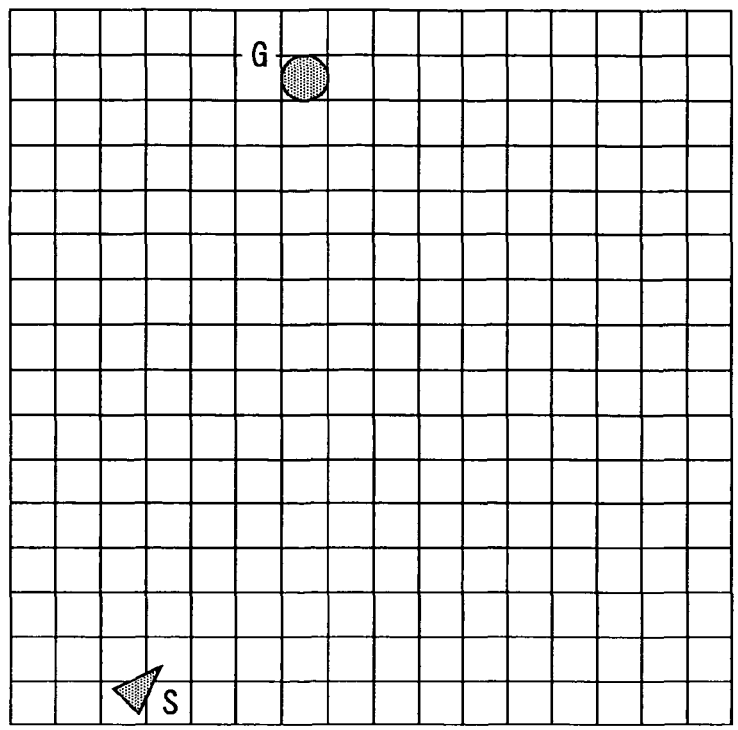
FIG. 2 is an illustration of a start point and a destination displayed on a screen of the navigation apparatus.

3. Featured Operation of the Navigation Apparatus According to the Present Embodiment 3.1 Outline of the Operation When the destination is defined, as shown in FIG. 2, by the user's operation of either of the remote controller 17 or the operation unit 7, the control unit 8 automatically searches and sets, as a guidance route, an optimum travel route toward the defined destination on the basis of the present location detected with the position detector 1. The automatic setting method of the optimum travel route is based on, in the present embodiment, the technique known as Dijkstra method from among various kinds of method.

Figure 3:
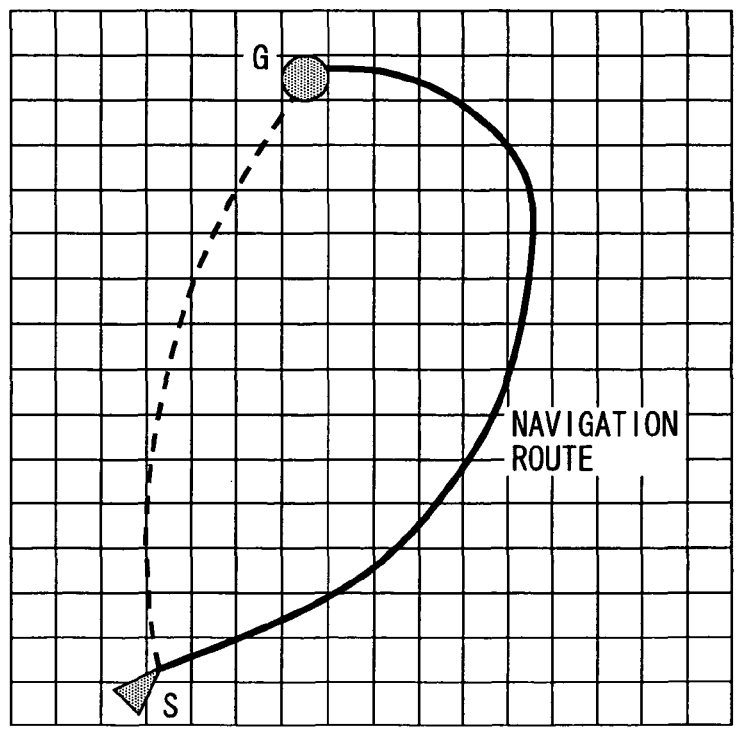
FIG. 3 is an illustration of a travel route displayed on the screen of the navigation apparatus.

Then, the control unit 8 displays, on the display unit 10, an image of the travel route (a thick solid line in FIG. 3, designated as a recommended route hereinafter) set as the guidance route on the map together with the marks respectively indicating the current position and the destination, after combining the map information stored in the map data input unit 6 or the memory 9 with the travel route. In FIGS. 2 and 3 as well as other drawings, the image showing the map is omitted.

When the travel route intended by the user (i.e., a broken line in FIG. 3) is different from the recommended travel route that is found by the control unit 8, the recommended route is modified (or amended) in the following manner.

Figure 4:
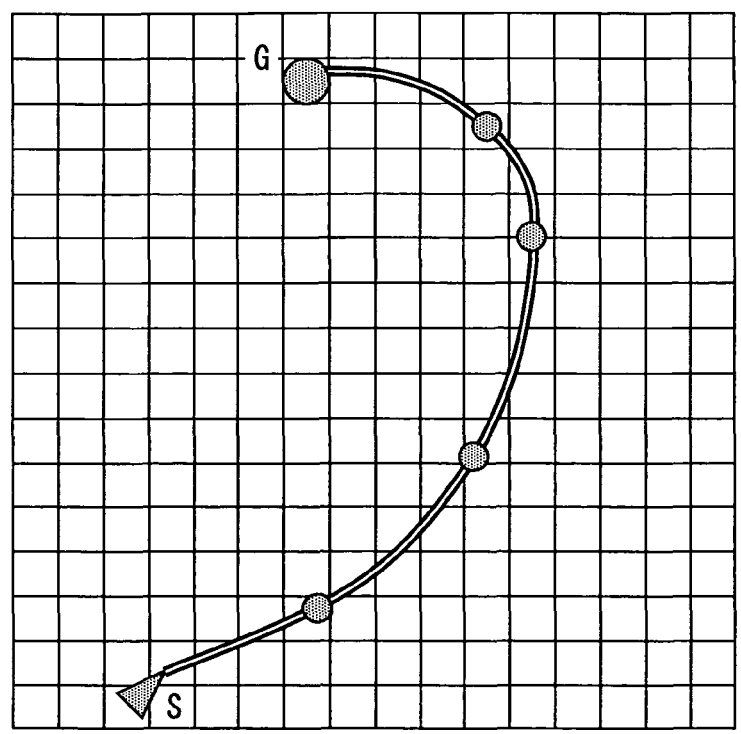
FIG. 4 is another illustration of the travel route displayed on the screen of the navigation apparatus.

That is, when a route edit mode is selected by the user with the operation of the operation unit 7 while the recommended route is drawn on the display unit 10, the line representation of the recommended route is changed for indicating that the route edit mode is currently set in operation, and edit points (i.e., nodes) on the currently-displayed recommended route that can be edited are shown (see FIG. 4). In FIG. 4, the line type of the recommended route is changed, with the edit points represented as round marks. However, the line type and the edit point marking are not limited to those representations.

The edit point is a point on the travel route shown on the map, which can be "edited" (i.e., changed) directly by the user operation. The edit points are respectively different on each of multiple map information layers. That is, due to the different scale of map display on each of those map information layers, the edit points on each of the layers are differentiated, and one map information layer is associated with another layer through a link defined between the edit points.

More practically, the number of edit points decreases as the map scale increases to the larger scale, or the number of edit points increases as the map scale is reduced to the smaller one. In the present embodiment, the edit points are set and displayed on the display unit 10 by using a map scale that is used to display the map at a time of selection of the route edit mode by the user.

Figure 5:
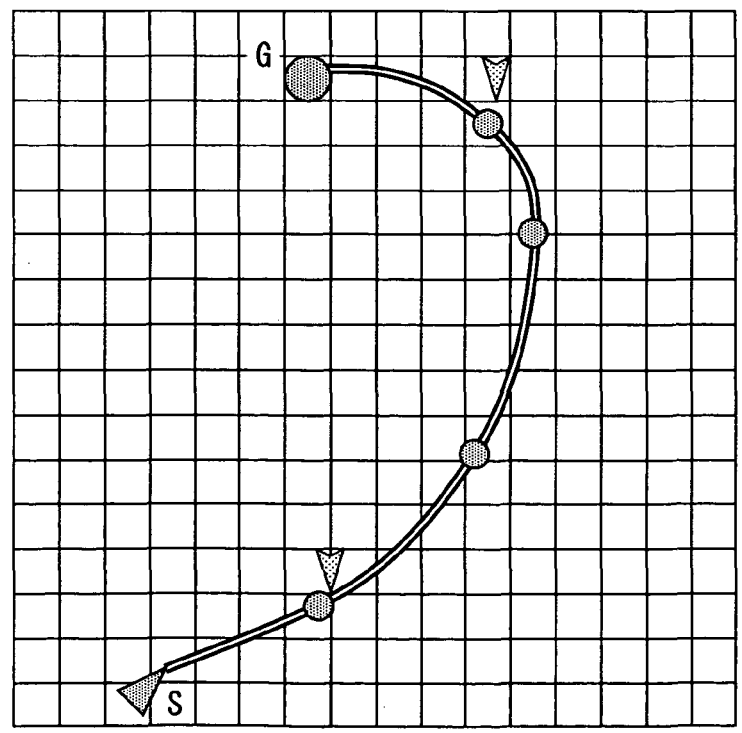
FIG. 5 is yet another illustration of the travel route displayed on the screen of the navigation apparatus.

Then, the edit points are displayed and the guidance voice/ guidance image is provided for prompting the user to select the edit start point and the edit end point (see FIG. 5). Therefore, the user selects the edit start point and the edit end point from among the edit points currently displayed on the display unit 10 upon receiving the guidance.

Figure 6:
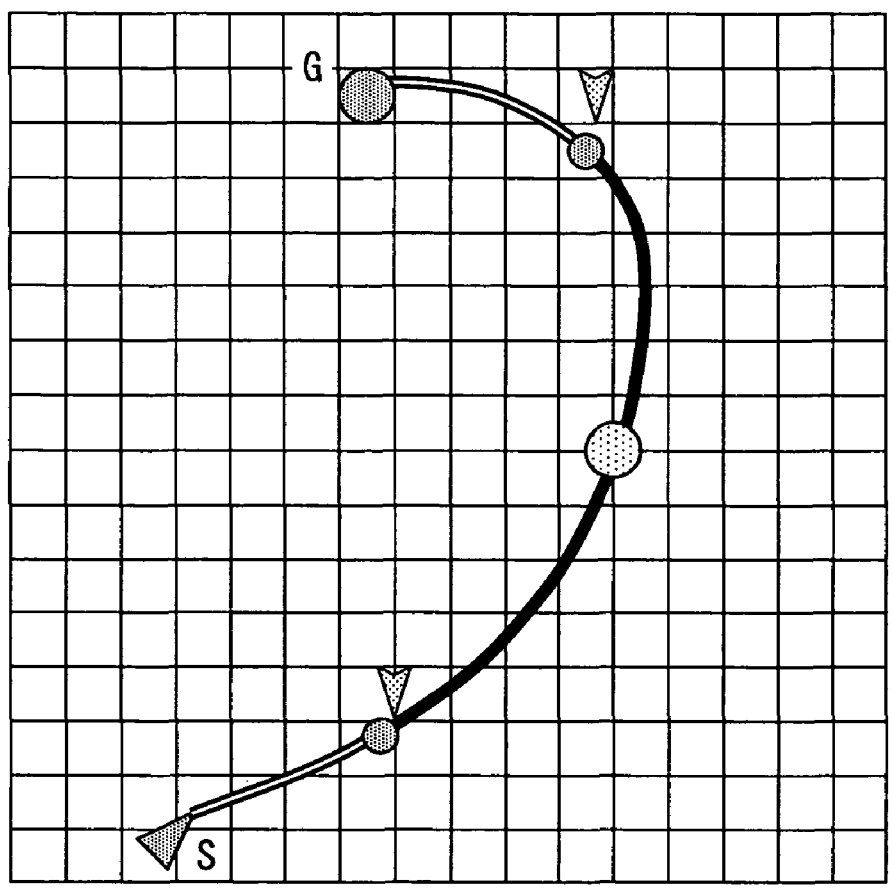
FIG. 6 is still yet another illustration of the travel route displayed on the screen of the navigation apparatus.

The edit start point and the edit end point represent edges of the desired edit section (i.e., change section) on the recommended route (e.g., a solid line in FIG. 6). The edit start point is one edge on the current position side of the edit section, and the edit end point is another edge on the destination side of the edit section.

Then, an edit point is selected as a reference point when the user touches one of the edit points being displayed on the display unit 10. That is, for example, with the edit start/end points in a selected condition, the control unit 8 determines which one of the edit points is touched by the user by utilizing the touch panel function, and the selected reference point is exclusively displayed on the display unit 10 as shown in FIG. 6.

In this case, the reference point is a point on the travel route displayed on the display unit 10, and the reference point can be moved based on a direct instruction from the user. Therefore, as described later, the control unit 8 basically searches for the travel route that passes the reference point on the map indicated by the user.

In the above-described manner, the map information layer (i.e., the map scale) having the recommended route to be edited thereon as well as the edit start and end points are determined, and the reference point on the map is moved according to the movement of the user finger that is touching the reference point on the display unit 10 as shown in FIGS. 7A and 7B. That is, the reference point is moved (edited) by the user simultaneously with the amendments (i.e., editing) of the line representing the travel route based on the position of the moved reference point on the map as well as the map information.

The reference point is, at the time of route editing, always displayed on the map until the edit start/end points and edit points are re-defined. On the other hand, the line representing the travel route after amendments is displayed on the display unit 10 only after the discovery of the new travel route relevant to the after-move reference point. That is, in other words, the line representing the after-amendments travel route is not displayed before the after-amendments travel route is found.

3.2. Details of the Operation

FIG. 8 is a flow chart that shows the control (hereafter, mentioned as "route edit control") to be executed in the above-mentioned outline operation. This route edit control is performed by the control unit 8, and the program to execute the route edit control is memorized in the ROM of the control unit 8.

When the destination is set by the user, a recommended route to the destination is searched for on the basis of the current position as mentioned above, and then the searched recommended route is displayed on the display unit 10 (S1).

Next, whether the route edit mode is selected by the user or not is determined (S5), and if the edit mode is not selected (S5:NO), the process concludes itself.

On the other hand, if the edit mode is selected (S5:YES), the operation mode of the navigation apparatus shifts to the route edit mode (S10), and the edit points on the recommended route currently displayed on the display unit 10 is displayed (S15).

Then, it is determined whether user-intended edit points are displayed or not by providing the user with a query either in the vocal message or in the text message. The edit points are determined either as the intended one or not based on the answer from the user for the query (S20).

If it is determined that the user-intended edit points are not displayed (S20:NO), the map information layer is changed to the smaller scale layer than the current scale (S25), and the edit points according to the changed scale are then displayed along the recommended route on the display unit 10 (S25).

If, on the other hand, it is determined the user-intended edit points are displayed (S20:YES), an edit start point, an edit end point, together with the reference point are set according to the instruction from the user (S30,S35), and the reference point is moved and displayed based on the user operation (S40).

At this point, the travel route passing through either the reference point or the proximity of the reference point (i.e., designated as an "indication point" hereinafter) indicated by the user is searched for, and then it is determined whether the travel route passing through the indication point has been found (S45).

Then, if it is determined that the travel route passing through the indication point has not been found (S45: NO), another query for determining if it is required for the travel route to pass through the indication point is provided for the user (in voice or in text). Then, the user's intention whether the travel route should pass through the indication point is determined (S50).

At this point, if it is determined that the user desires for the travel route to pass through the indication point (S50:YES), the currently-displayed map information layer is changed to the smaller scale (S55), and whether the travel route passing the indication point has been found or not is re-determined on the map information layer with the changed scale (S45).

In this case, because the map information layer having the smaller scale is determined through the link that is associated with the node, that is, the indication point currently displayed, the travel route search can be continued after the change of the map information layer.

Then, the reference point is, again, moved and displayed on the basis of the user operation, if it is determined that the travel route may not pass through the indication point (S50: NO).

Then, if it is determined that the travel route passing through the indication point (S45:YES), the alternative route that has been found is displayed on the display unit 10 (S60), and a query for inquiring the user whether the displayed alternative route should be used as the guidance route in the voice/text is provided for the user. Then, according to the user response to the query, use of the alternative route is determined (S65).

If it is determined that the alternative route is not used as the guidance route (S65:NO), the reference point is moved and displayed according to the user operation again (S40). On the other hand, the current route is changed to the alternative route (S70), if it is determined that the alternative route has been selected by the user (S65:YES).

4. Advantageous Effects of the Navigation Apparatus According to the Present Embodiment In the present embodiment, the reference point on the travel route displayed on the map on the display unit 10 is moved according to the user operation (S40), and the travel route is amended based on the position of the reference point on the map and the map information. Therefore, the travel route once set and displayed on the map is amended/re-routed/re-defined according to the reference point on the map, the edit start/end points, the move direction of the reference point, and the map information.

As a result, the set-and-displayed route (i.e., a first recommendation of the travel route) can be modified in a manner that has flexibility of a rubber band, which is user-friendly, as well as novel and un-obvious from the conventional art.

Further, in the present embodiment, the navigation apparatus displays the newly-found travel route on the display unit 10 only after the new route is discovered. That is, before the discovery of the new route, the travel route is not displayed on the display unit 10 (S60). Therefore, the user can easily recognize that the travel route after the amendment has been discovered or not, thereby being enabled to have an improved usability.

Furthermore, in the present embodiment, the reference point is always displayed on the display unit 10, thereby enabling the user to easily recognize the positional change of the reference point, that is, for example, where the reference point is located on the map. That is, the usability of the navigation apparatus is improved due to the ease of locating the route change.

Furthermore, the process time for finding the modified route is reduced due to the use of the map scale that is used at the time of starting the route edit mode. That is, when the route edit mode is set in operation, the map information having the currently displayed map scale for allowing the selection of the edit points is used to modify the travel route, thereby leading to the reduced operation time.

In other words, if the map information having a different map scale is used to locate the reference point, the process time will be increased due to the process load for considering the scale conversion, even when the map information is available in a couple of different scales.

However, in the present embodiment, the map information used to modify the travel route is having the same scale as the one used to display the map on the display unit 10, thereby making it un-necessary to consider the scale conversion that leads to the increase of the process time.

Furthermore, under an instruction from the user, the modification of the travel route may be based on the different map scale that is different from the currently-used map scale (S20, S50), thereby leading to the travel route amendment that appropriately reflects the user's intention.

Furthermore, the amended travel route may once again be amended based on the map information and the reference point on the amended route (S65:NO), thereby enabling the user to repeat the amendment/modification of the travel route until the amended route satisfies the user.

5. Relationship Between the Specificity of the Embodiment and Claim Language

In the present embodiment, the display unit 10 corresponds to a display unit recited in the claims, S30 and S35, etc. correspond to a set unit recited in the claims, S40 etc. correspond to a move unit recited in the claims, and S60 etc. correspond to a correction unit recited in the claims.

(Second Embodiment)

Figure 9A:
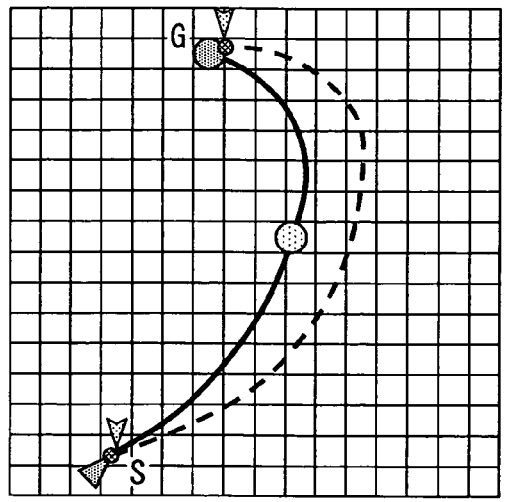
FIGS. 9A to 9C are illustrations of the travel, route displayed on the screen of the navigation apparatus.
Figure 9B:
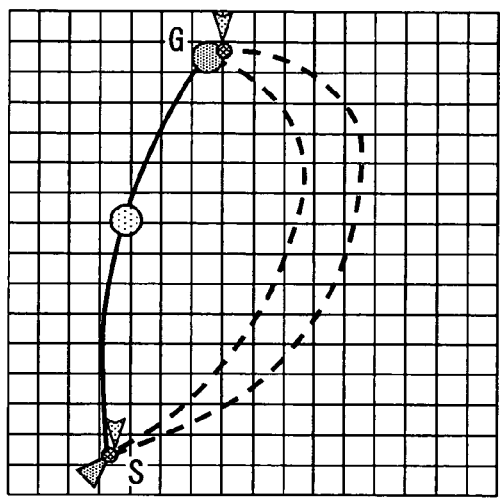
Figure 9C:
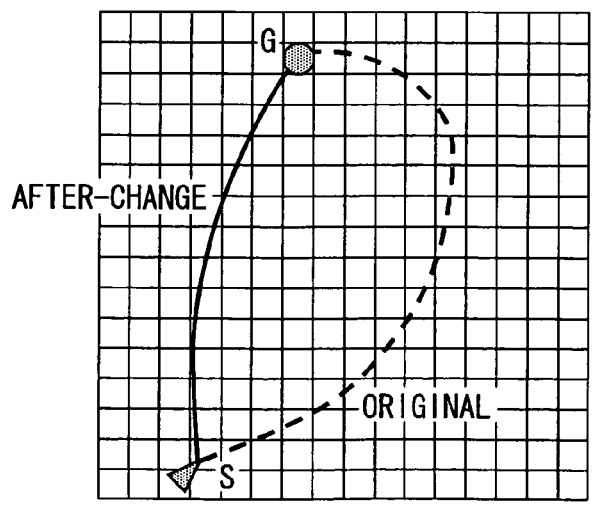

In the present embodiment, the alternative route is calculated as a smooth line, as shown in FIGS. 9A to 9C, without considering the map information. That is, the alternative route is first defined and displayed as a smoothly curved line defined by the reference point and the edit start/end points, and the line is then approximated by the actual routing on the map information for determining the alternative route.

That is, a smooth line that passes through the edit start point, the reference point, and the edit end point without considering the map information is calculated and displayed as shown in FIGS. 9A and 9B. Then, in FIG. 9C, the searched travel route based on the smooth line for approximating the new route and the map information at the time when the user released his/her hand or finger from the reference point on the display unit 10.

Figure 10:
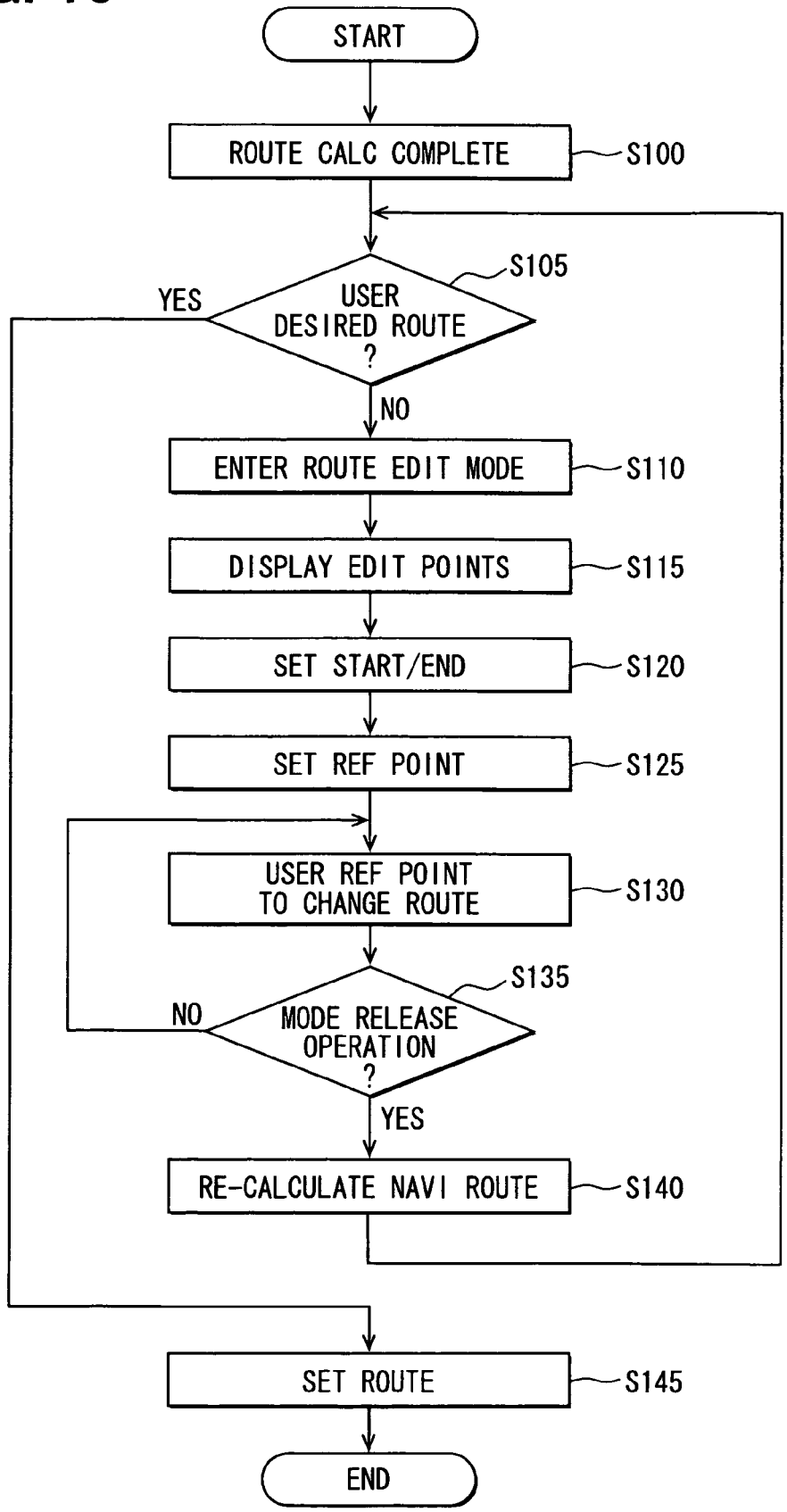
FIG. 10 is a flow chart of route editing processing in a second embodiment of the present disclosure.

FIG. 10 shows a flow chart of the route edit control according to the present embodiment.

In the edit control process, the recommended route toward the destination is searched for and displayed on the display unit 10, on the basis of the current position when the destination is set by the user, as mentioned above (S100).

Then, whether the route edit mode has been selected by the user or not is determined (S105). If the route edit mode has not been selected (S105:NO), the currently displayed travel route (i.e., the recommended route) is set as the guidance route (S145), and the process concludes itself.

On the other hand, if the route edit mode has been selected (S105:YES), the operation of the navigation apparatus shifts to the route edit mode (S110), and the edit points on the currently-displayed recommended route are shown on the display unit 10 (S115).

Then, the reference point as well as the edit start/end points are set according to the user instruction (S120, S125), and a smoothly curved line connecting the edit start/end points and the reference point is calculated and displayed as the reference point is moved according to the user operation (S130).

Next, whether the user has released his/her hand or finger from the reference point is determined (S135), and if the user has released his/her hand from the reference point (S135:YES), the travel route that approximates the line shape displayed on the display unit 10 at the time of the release of the hand is searched for based on the map information, and then displayed on the display unit 10 (S140).

When it is determined that the user has not released his/her hand from the reference point (S135:NO), the smooth line between the edit start/end points and the reference point is re-calculated and displayed (S130).

Then, the selection of the route edit mode by the user is re-determined (S105), and, if the edit mode has not been selected (S105:NO), the process concludes itself after setting the currently-display recommended route is as the guidance route (S145).

(Other Embodiments)

The above embodiments displaying travel route on the display unit 10 only after the discovery of the new/amended route does not confine the present invention. That is, the new route may be presented differently before/after the discovery.

Further, the reference point basically being shown on the map in the route edit mode may be altered.

Furthermore, the user input required for determining the passing of the route through the indication point (S50) may be omitted. That is, the map information layer may be automatically changed to the smaller scale layer from the current one.

Furthermore, in one of the above embodiments, the same map information layer is used throughout the route edit mode. However, the map information layer may be changed after the route edit mode has been started. That is, a step for switching the layer may be incorporated as the other one of the above embodiments.

Such changes, modifications, and summarized scheme are to be understood as being within the scope of the present disclosure as defined by appended claims.

What is claimed is:

1. A vehicle navigation apparatus adapted to have a storage unit for storing map information, and configured to display a travel route from a current position to a destination based on the map information, the apparatus comprising:

a display unit for displaying a map and the travel route based on the map information;

a first screen control that controls the display unit to display a first screen having a plurality of edit points between the current position and the destination, the edit points being on the travel route, for changing the travel route based on a user operation;

a set unit for setting an edit start point and an edit end point respectively to one of the edit points provided on the first screen between the current position and the destination on the travel route according to a user operation;

a move unit for moving, according to the user operation, a reference point from an initial position selectively set to one of the edit points between the edit start point and the edit end point on the travel route being displayed on the display unit, toward a different position on the map being displayed on the display unit; and a revision unit for revising the travel route within bounds defined by the edit start point and the edit end point, based on each of (a) a position of the reference point having been moved by the move unit on the map, (b) the edit start point and the edit end point respectively set by the set unit, (c) a move direction of the movement of the reference point, and (d) the map information.

2. The vehicle navigation apparatus of claim 1, wherein when an after-revision travel route is found by the revision unit after the reference point is moved, the after-revision travel route is displayed on the display unit, and the after-revision travel route is put in a non-display condition until the after-revision travel route is entirely discovered.

3. The vehicle navigation apparatus of claim 2, wherein the reference point is always displayed while the revision unit is revising the travel route.

4. The vehicle navigation apparatus of claim 1, wherein the reference point is always displayed while the revision unit is revising the travel route.

5. The vehicle navigation apparatus of claim 1, wherein the storage unit stores information having various scales as the map information, and the revision unit revises the travel route based on the map information that has the same scale as the map that is being displayed on the display unit at a time when the move unit has become operable.

6. The vehicle navigation apparatus of claim 5, wherein the various scales for the map information include a currently used scale and a different scale which is different from the currently used scale, the revision unit revises the travel route based on the map information that has the different scale instead of the currently used scale, when a user instruction is provided to change the currently used scale for the map information.

7. The vehicle navigation apparatus of claim 1, wherein the revision unit is configured to re-revise the travel route that is in an already-revised condition, based on the map information and the edit points on the travel route already having been revised by the revision unit in the first revision.

8. The vehicle navigation apparatus of claim 1 further comprising, a determination unit for determining whether the user-intended edit points are being displayed; and a second screen for displaying the user-intended edit points on the display unit after changing a current scale of the map information to a different scale when the determination unit determines that the user-intended edit points are not being displayed.

9. The vehicle navigation apparatus of claim 8, wherein the determination unit provides a user with a query that queries whether the user-intended edit points reflecting the user intention are being displayed in a form of at least one of text message and audible voice, and the determination unit determines the displaying of the edit points based on a user response to the query.

10. The vehicle navigation apparatus of claim 1, wherein the edit points are represented as nodes displayed on the travel route on the display unit.

11. The vehicle navigation apparatus of claim 1, wherein the user operation is a touch of one of the edit points being displayed on the display unit.

12. The vehicle navigation apparatus of claim 1, wherein the revision unit revises the travel route between the edit start point and the edit end point to pass around the move direction which the reference point was moved.

13. A vehicle navigation apparatus adapted to have a storage unit for storing map information, and configured to display a travel route from a current position to a destination based on the map information, the apparatus comprising:

a display unit for displaying a map and the travel route based on the map information;

a first screen control that controls the display unit to display a first screen having a plurality of edit points between the current position and the destination, the edit points being on the travel route, for changing the travel route based on a user operation;

a set unit for setting an edit start point and an edit end point respectively to one of the edit points provided on the first screen between the current position and the destination on the travel route according to a user operation;

a move unit for moving, according to the user operation, a reference point from an initial position selectively set to one of the edit points between the edit start point and the edit end point on the travel route being displayed on the display unit, toward a different position on the map being displayed on the display unit; and a revision unit for revising the travel route within bounds defined by the edit start point and the edit end point, based on each of (a) a position of the reference point having been moved by the move unit on the map, (b) the edit start point and the edit end point respectively set by the set unit, (c) a move direction of the movement of the reference point, and (d) the map information, wherein when an after-revision travel route is found by the revision unit after the reference point is moved, the after-revision travel route is displayed on the display unit, and the after-revision travel route is put in a non-display condition until the after-revision travel route is entirely discovered, the reference point is always displayed while the revision unit is revising the travel route, the edit points are represented as nodes displayed on the travel route on the display unit, and the user operation is a touch of one of the edit points being displayed on the display unit.

* * * * *